United States Patent [19]

Coleman et al.

[11] Patent Number: 4,868,961

[45] Date of Patent: Sep. 26, 1989

[54] APPARATUS FOR ENGRAVING VEIN CUTS

[75] Inventors: Samuel L. Coleman, Rapid City, S. Dak.; Willem T. de Graaff, Albuquerque, N. Mex.

[73] Assignee: Coleman-Frizzell, Inc., Rapid City, S. Dak.

[21] Appl. No.: 5,076

[22] Filed: Jan. 20, 1987

[51] Int. Cl.[4] .......................... B23C 3/00; B23P 15/00

[52] U.S. Cl. .................................... 29/33 Q; 29/33 S; 29/160.6; 409/157

[58] Field of Search .................... 29/33 S, 33 Q, 160.6, 29/563; 409/157, 298, 304; 72/189, 191; 51/80 A, 81 R

[56] References Cited

U.S. PATENT DOCUMENTS 2,573,737 11/1951 Scavullo ........................ 29/160.6 X 4,277,868 7/1981 Huber et al. ........................ 29/33 Q 4,781,049 11/1988 Farrar et al. .................... 409/157 X

*Primary Examiner*—Z. R. Bilinsky

*Attorney, Agent, or Firm*—Zarley, McKee, Thomte Voorhees & Sease

[57] ABSTRACT

An apparatus for engraving vein cuts in a flat metal strip is described including a support adapted to support the metal strip thereon. Three air-driven motors are mounted on the support and have rotary cutting tools thereon which are utilized to cut angularly disposed vein cuts and a horizontally disposed vein cut in one surface of the metal strip. The strip is advanced across the support with the cutting tools being brought into engagement with the strip at the proper time to create the vein cuts therein. A punch is also mounted on the support for creating indexing notches at the lower edge of the strip. The sequential engraving and advancing of the strip through the support is controlled by a programmable controller.

11 Claims, 10 Drawing Sheets

APPARATUS FOR ENGRAVING VEIN CUTS

BACKGROUND OF THE INVENTION

This invention relates to an apparatus for engraving vein cuts and more particularly to an apparatus for engraving vein cuts in an elongated flat metal strip which will have leaves stamped therefrom for use in the manufacture of jewelry.

A certain design of gold jewelry known as Black Hills Gold or Black Hills Gold Jewelry is sold throughout the United States and is manufactured in the Black Hills area of South Dakota. Black Hills Gold Jewelry normally consists of a plurality of gold leaves which are secured together in a predetermined pattern on rings, pendants, earrings, etc.

In the normal manufacture of the jewelry, the individual leaves are stamped or punched from a flat strip of gold material. Once the leaves have been stamped from the gold strip, they are assembled on a soldering board and a gold solder paste is applied to the leaves. Heat is then applied to melt the gold solder paste thereby brazing the parts together. Oxidation does occur with this process and the same is removed by bombing and tumbling. After bombing and tumbling, the jewelry is gold plated and is then sometimes adhered with hot wax to a wooden dowel. This is done to hold the jewelry in place so it can be hand-florentined and hand-engraved.

The individual leaves are hand-florentined by manually bringing the leaf into engagement with a "wriggle" machine which includes a tool bit which moves in a rocking motion against one surface of the leaf to impart a mat or florentine finish thereto. The florentine process brings out or highlights the color of the gold and provides contrast for the vein cuts which will subsequently be engraved in the leaves. The vein cuts are also commonly referred to as bright cuts. After the individual leaves have been hand-florentined, the leaf veins or bright cuts are then hand-engraved in the leaves. The leaf veins are created or engraved in the individual leaves by employing a highly polished and sharp tool bit to cut the veins in the jewelry leaves. The above described process is extremely time-consuming and is labor-intensive.

In applicant's application filed simultaneously herewith entitled "Apparatus for Creating a Florentine Pattern on a Gold Strip", an apparatus is disclosed which automatically applies the florentine finish to the gold strip.

It is therefore a principal object of the invention to provide a machine which automatically creates vein cuts in a florentined gold strip.

Still another object of the invention is to provide an apparatus which creates the vein or bright cuts in a predetermine pattern on a gold strip with the gold strip being subsequently punched or stamped to form individual leaves having the vein cuts therein.

Still another object of the invention is to provide an apparatus of the type described which creates an index notch on one edge of thereof to aid in subsequently punching individual leaves from the gold strip.

These and other objects will be apparent to those skilled in the art.

SUMMARY OF THE INVENTION

Figure 1:
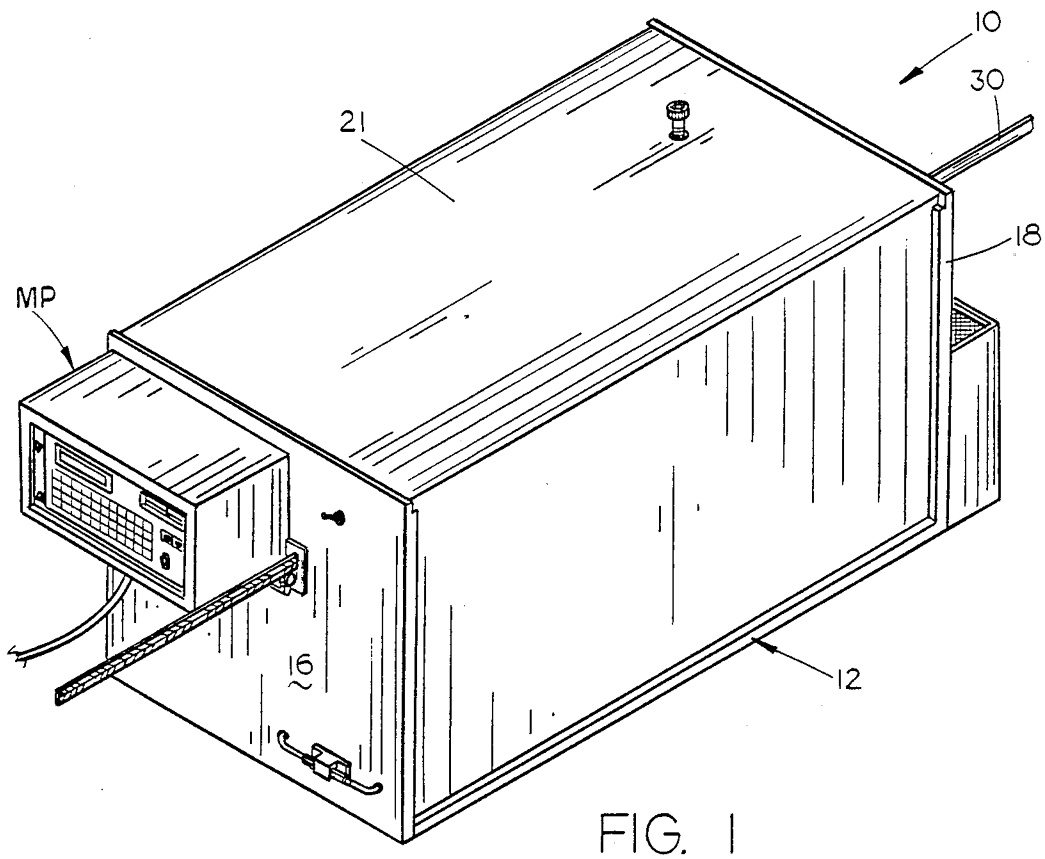
FIG. 1 is a front perspective view of the apparatus of this invention as seen from the left front of the apparatus.
Figure 2:
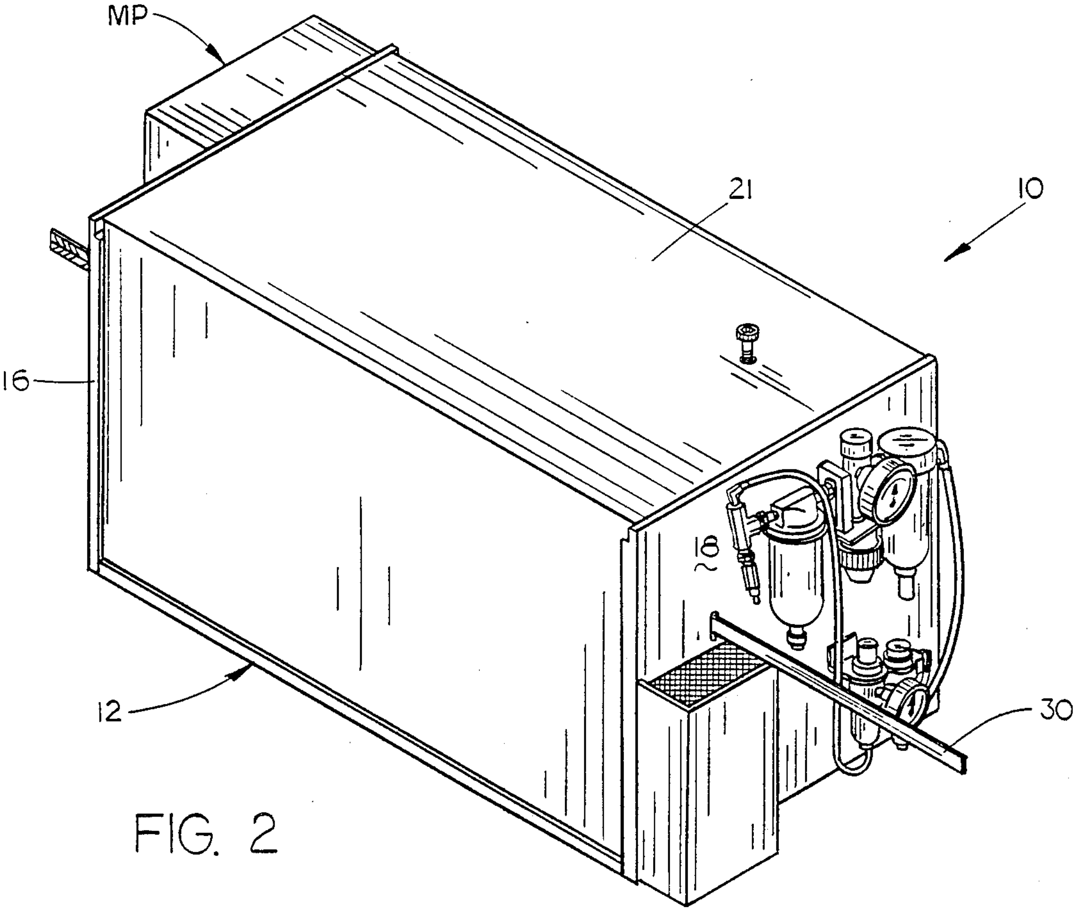
FIG. 2 is a front perspective view of the apparatus of this invention as seen from the right front of the invention.

An apparatus for engraving bright or vein cuts in a florentined gold strip is described and comprises a support means including means for moving the elongated flat gold strip thereacross. An advancing mechanism is provided on the support means which grips the strip to advance the strip in predetermined increments in response to signals from a programmable controller. First, second and third air-powered engraving tools are mounted on the support means and are designed to create the bright or vein cuts in the leaf in a predetermined pattern. An air-operated punch is also mounted on the support means which is adapted to punch or form an indexing notch on one side edge of the strip to aid in the subsequent positioning of the gold strip when the individual leaves are punched or stamped therefrom.

DESCRIPTION OF THE PREFERRED EMBODIMENT

The numeral 10 refers to the apparatus of this invention which includes a support means 12 having a bottom 14, upstanding sides 16 and 18, and upstanding wall 20. Apparatus 10 may include an optional cover 21 if so desired. For purposes of description, wall 20 will be described as having a rearward side 22 and a forward side 24. Although the wall 20 is shown in an upstanding position, the apparatus will work equally as well if the wall 20 is positioned in other attitudes such as horizontal, inclined, etc. However, for purposes of observation, maintenance and repair, it is preferred that the wall 20 be positioned in an upright manner.

Block member 26 is mounted on forward side 24 of wall 20 adjacent one end thereof and has a passageway 28 formed therein which movably receives the gold strip 30. Gold strip 30 will have been previously florentined by means of the apparatus described in the application filed simultaneously herewith entitled "Apparatus for Creating a Florentine Pattern on a Gold Strip".

Wall 20 is provided with an opening 32 behind passageway 28 adapted to receive plunger 34 of air cylinder 36. When plunger 34 is extended or moved forwardly relative to wall 20, the strip 30 is moved forwardly into engagement with block member 26 to hold the strip 30 in position or to brake the movement of the strip 30.

Wall 20 is provided with a pair of horizontally spaced slots 36 and 38 formed therein which horizontally slidably receive traveling blocks 40 and 42 respectively which are interconnected by a support rod 44 positioned forwardly of wall 20. Block 40 is comprised of a front block portion 46 secured to back block portion 48 with the block portions being secured together by screws 50. Block portion 46 is provided with a passageway 52 through which the strip 30 movably extends. A flat spring 54 is positioned in the front portion of passageway 52 as seen in the drawings.

Block 42 is comprised of a front block portion 56 secured to back block portion 58 by screws 60. Block portion 56 is provided with a passageway 62 through which the strip 30 movably extends. Flat spring 64 is positioned in the front portion of passageway 62 for a purpose to be described hereinafter.

Supports 66 and 68 are mounted on the rearward side 22 of wall 20 and have a pair of horizontally disposed guide rods 70 and 72 secured thereto which extend therebetween in a vertically spaced relationship. Blocks 40 and 42 are horizontally slidably mounted on guide rods 70 and 72 and are interconnected by a pair of bars 74 and 76 secured to and extending between back block portions 48 and 58. Spring 78 is positioned between the rearward end of block portion 56 and support 68 to return block 42 to the right when viewing the same from the front.

Air cylinder 80 is mounted in block 42 and has plunger 82 extending therefrom which is adapted to push the strip 30 forwardly into frictional or braking engagement with spring 64 when cylinder 80 is extended or actuated. Air cylinder 80' is mounted in block 40 and has plunger 82' extending therefrom which is adapted to push the strip 30 forwardly into frictional or braking engagement with spring 54 when cylinder 80' is extended or actuated.

Figure 5:
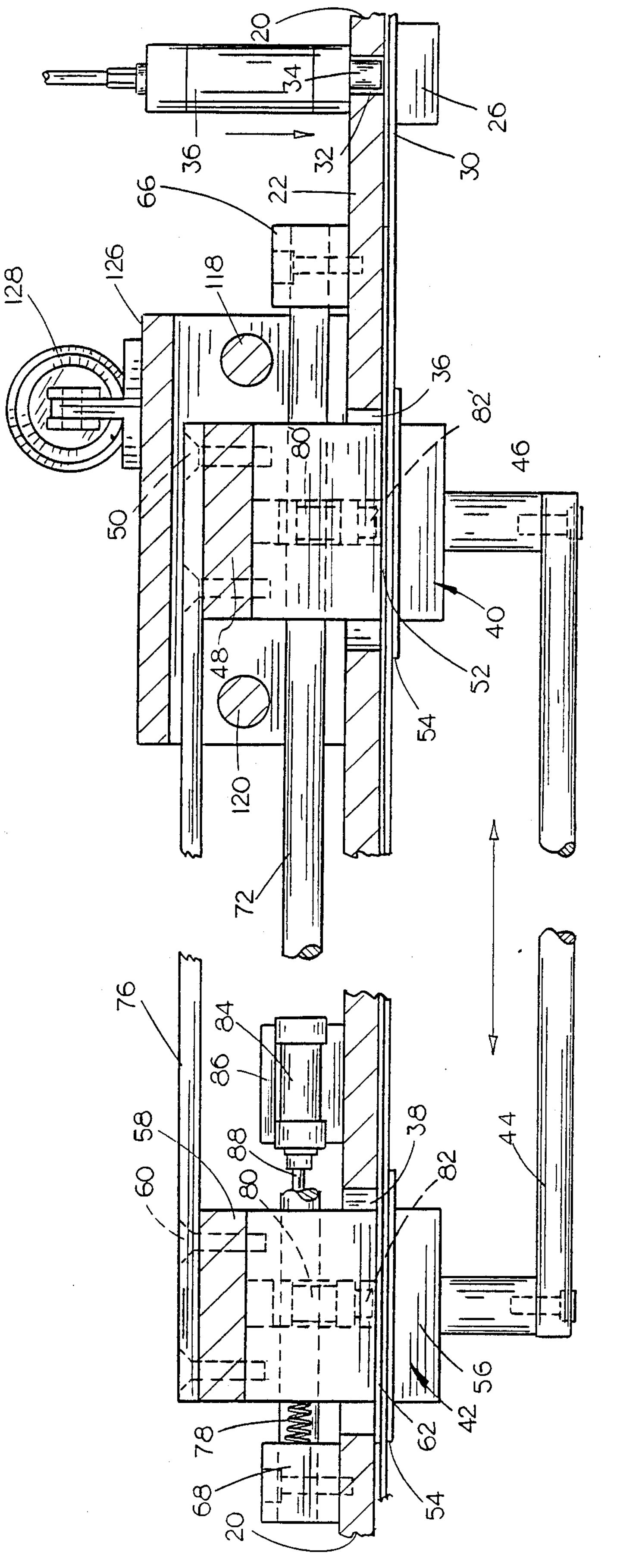
FIG. 5 is an enlarged sectional view as seen on lines 5—5 of FIG. 4.
Figure 6:
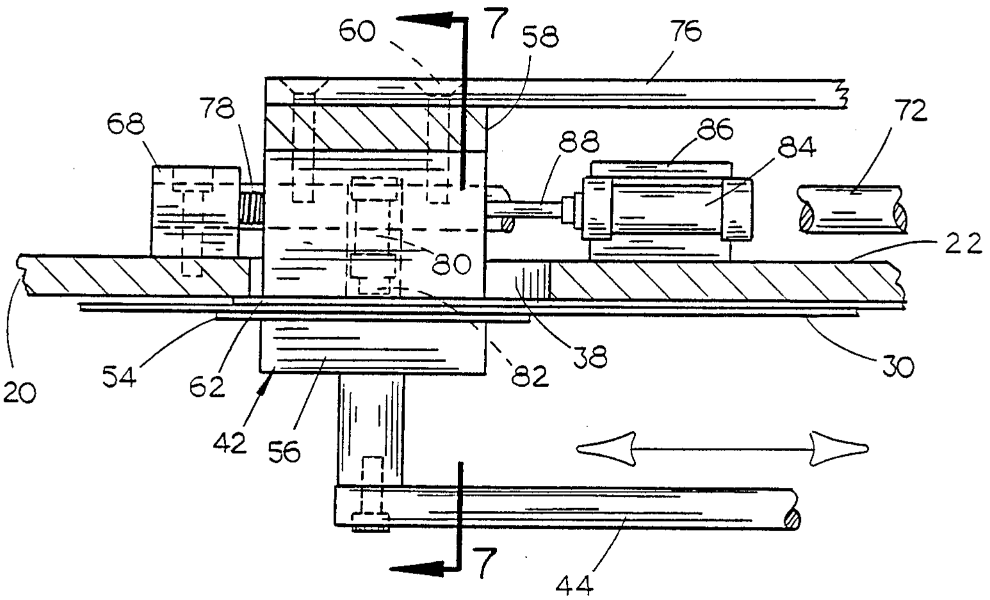
FIG. 6 is a sectional view similar to the left portion of FIG. 5 except that the strip advancer has been moved to the left from that of FIG. 5.
Figure 7:
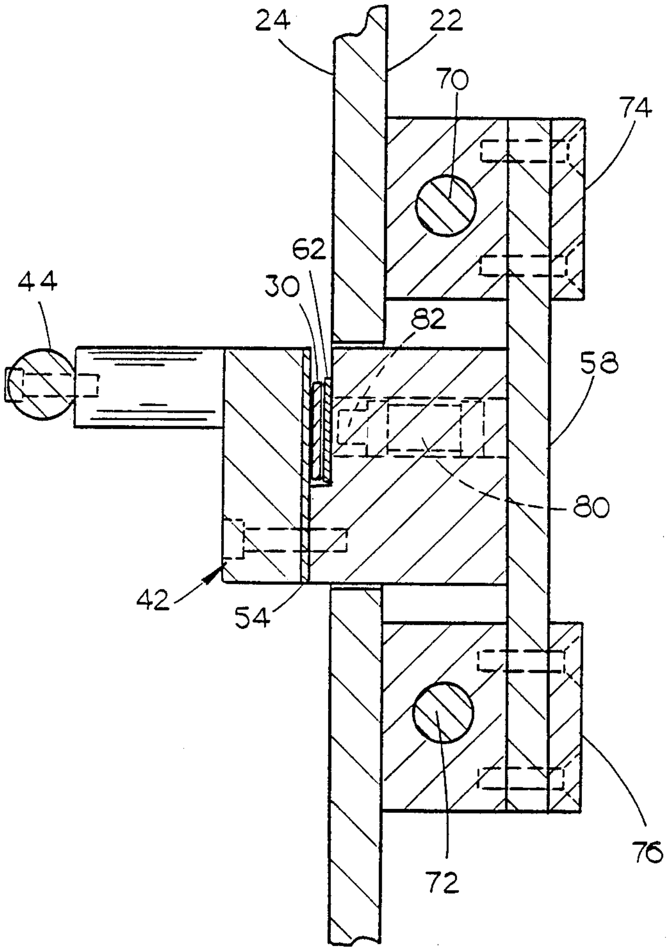
FIG. 7 is an enlarged sectional view seen on lines 7—7 of FIG. 6.
Figure 8:
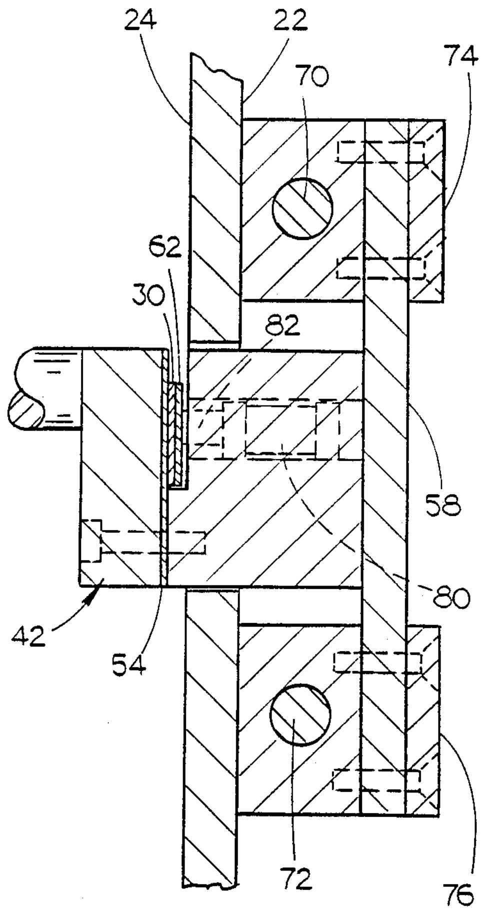
FIG. 8 is a view similar to FIG. 7 but which shows the gold strip being held or braked in position.
Figure 9:
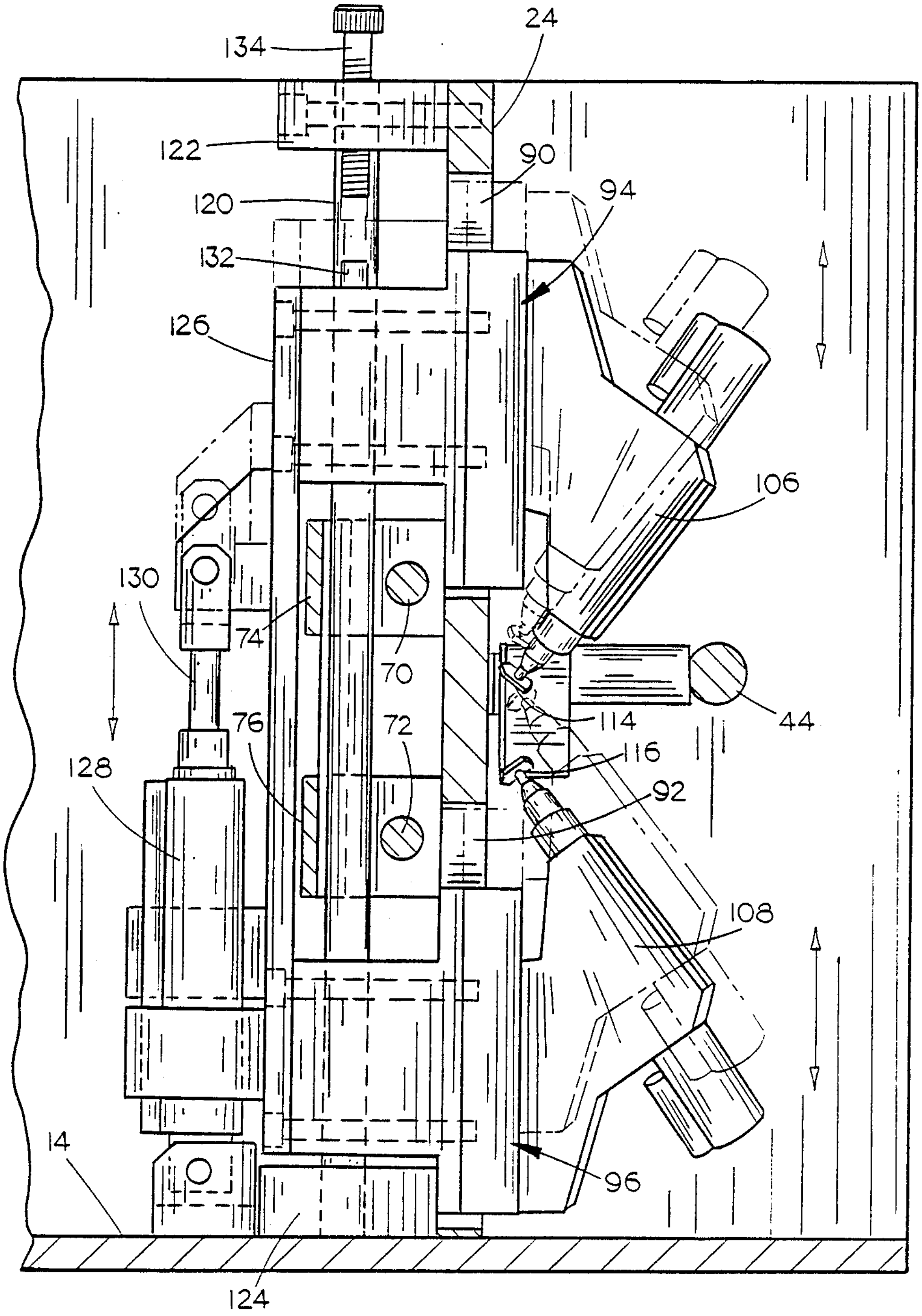
FIG. 9 is an enlarged sectional view as seen on lines 9—9 of FIG. 4 with the broken lines illustrating the various positions to which the components move.
Figure 11:
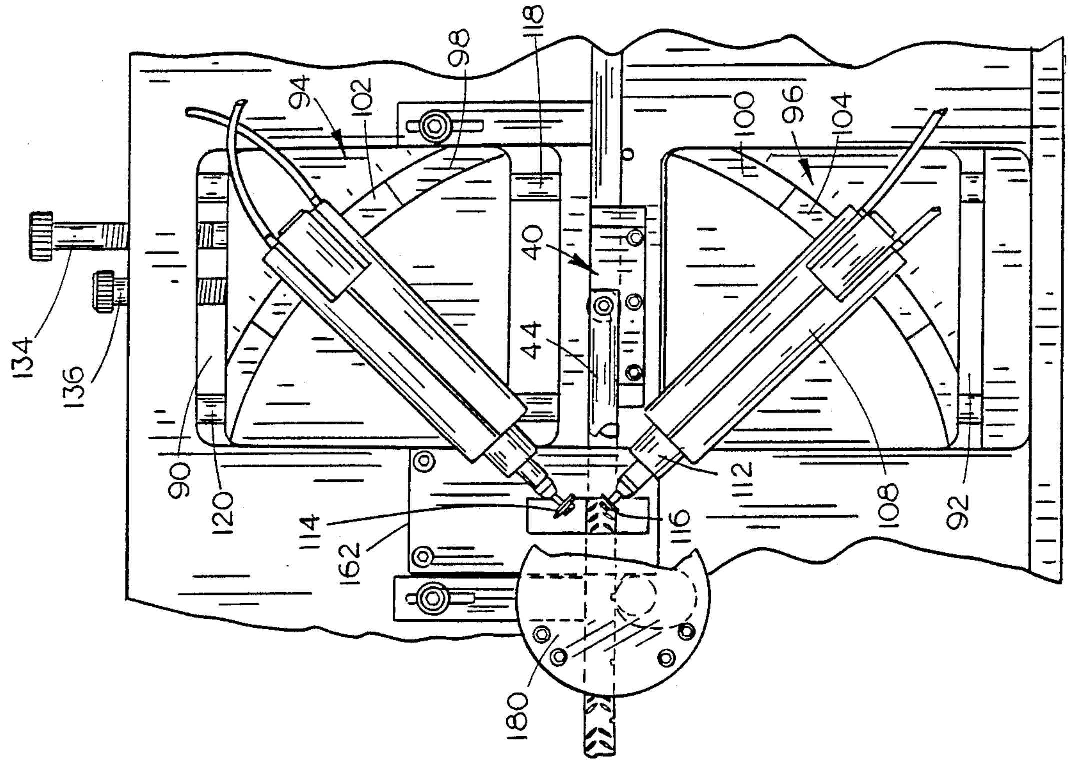
FIG. 11 is a view similar to that of FIG. 10 except that the angular vein cutting apparatus has been moved upwardly from the position of FIG. 10.

Air cylinder 84 is mounted on support 86 which is secured to the rearward side 22 of wall 20 and has a plunger 88 extending horizontally therefrom adapted to engage block portion 56 of block 42 to move the block 42 to the left as viewed in FIG. 5 against the resiliency of spring 78. The amount of movement of block 42 may be adjusted by adjusting the stroke of the plunger 88, by horizontally adjusting support 86, or by horizontally adjusting cylinder 84.

Figure 10:
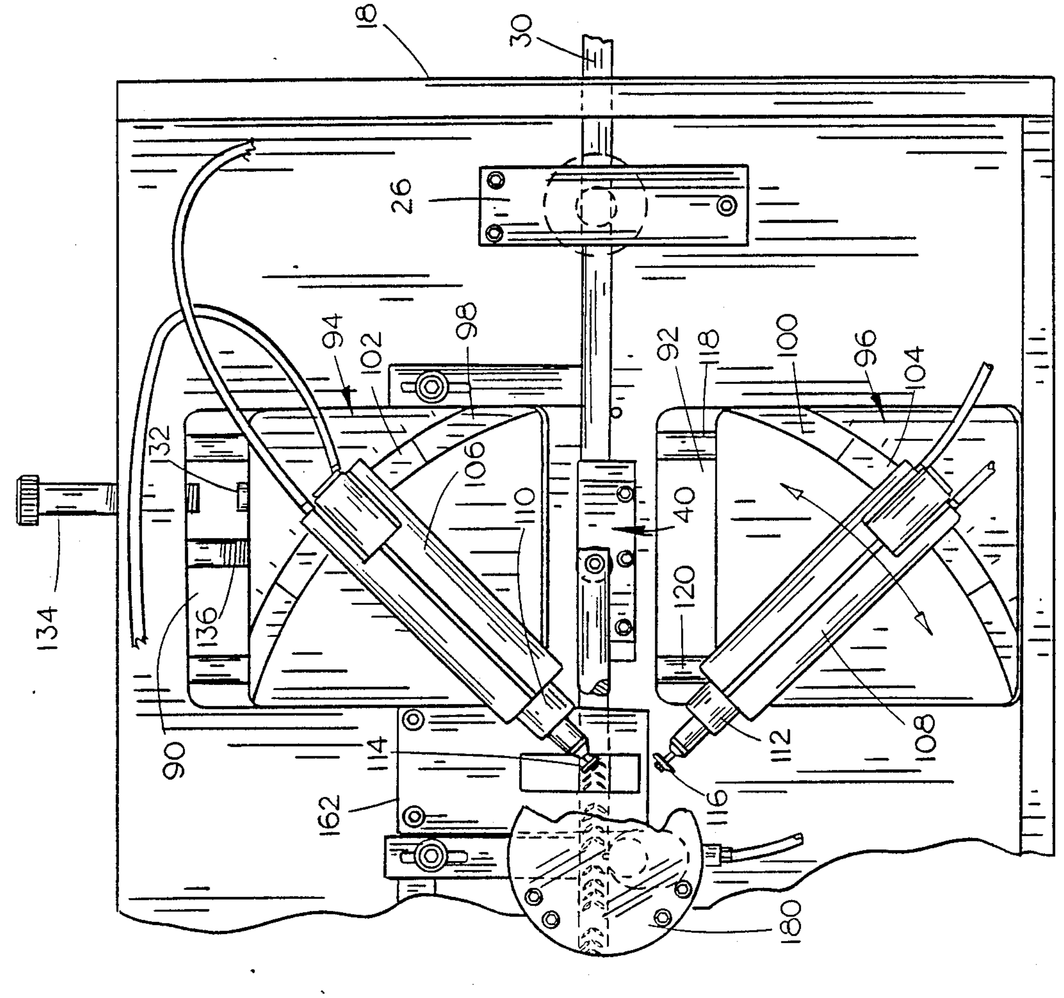
FIG. 10 is a partial front view of the apparatus.

Wall 20 is provided with a pair of vertically spaced openings 90 and 92 formed therein as seen in FIG. 10. Vein cutter supports 94 and 96 are vertically movably mounted in the openings 90 and 92 as seen in the drawings. The supports 94 and 96 are provided with arcuate grooves 98 and 100 formed therein respectively which are adapted to selectively adjustably receive arcuate segments 102 and 104 of mounts 106 and 108 respectively. Air motors 110 and 112 are longitudinally adjustably mounted in mounts 106 and 108 and have cutting blades 114 and 116 mounted thereon respectively.

Figure 4:
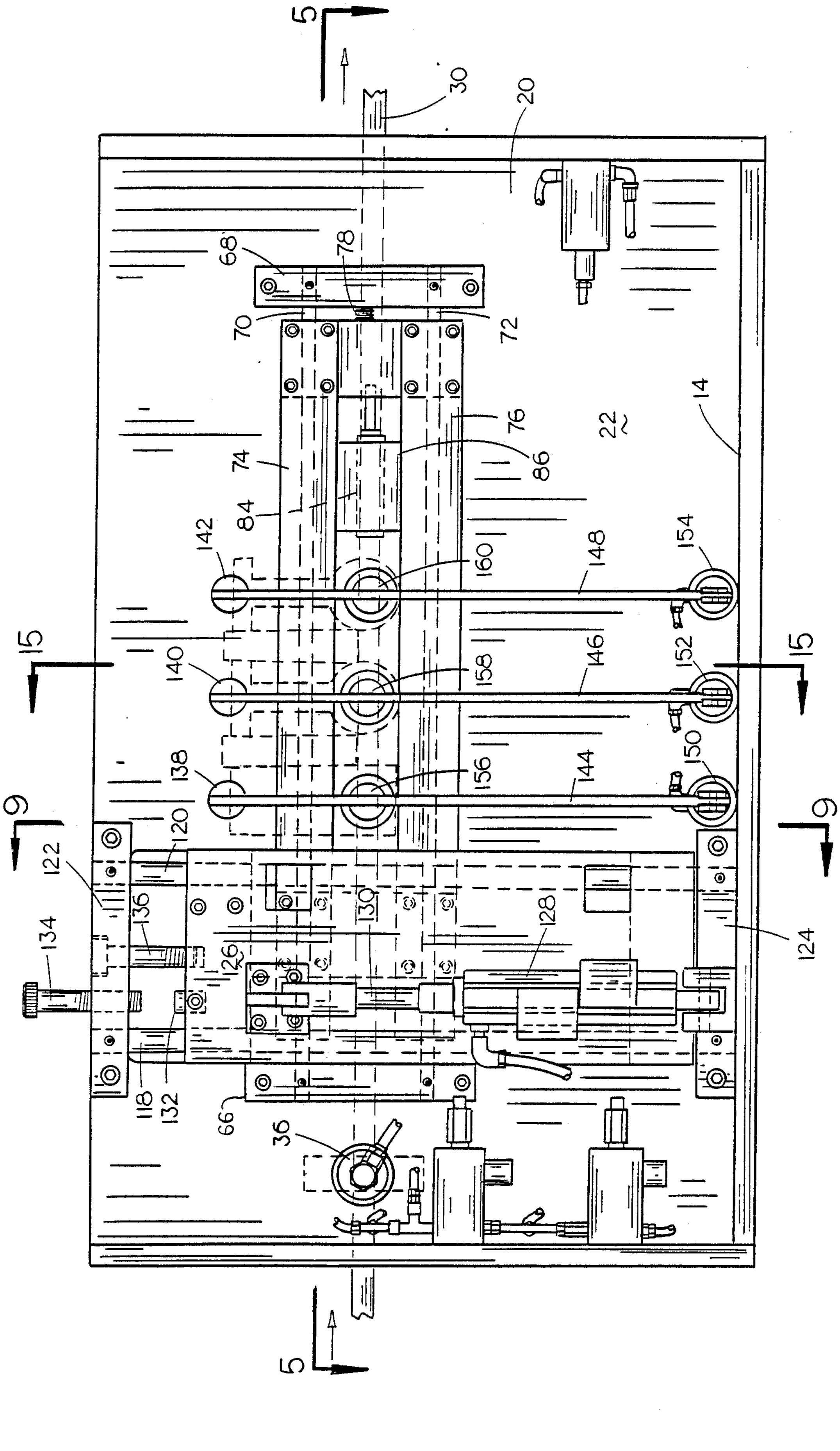
FIG. 4 is a rear elevational view of the apparatus.

Supports 94 and 96 are vertically movably mounted on vertically disposed guide rods 118 and 120 which are positioned rearwardly of rearward surface 22 and which are secured thereto by vertically spaced bars 122 and 124. Plate 126 is secured to the rearward ends of supports 94 and 96 and extends therebetween rearwardly of bars 74 and 76. Air cylinder 128 is connected at its base to bottom 14 and has its plunger 130 connected to plate 126 as seen in FIG. 4 for vertically moving supports 94 and 96 between upper and lower positions as will be described hereinafter.

Support 94 is provided with an upwardly extending stop 132 which is adapted to engage the lower end of vertically adjustable screw 134 mounted in bar 122 to selectively limit the upward movement of supports 94 and 96. Cap screw 136 is threadably mounted in support 94 and is received by bar 122 as shown in FIG. 4 to adjustably limit the downward movement of supports 94 and 96.

Cylindrical arms 138, 140 and 142 are secured to wall 20 and extend horizontally rearwardly therefrom above bar 74. The upper ends of levers 144, 146 and 148 are pivotally connected to the rearward ends of arms 138, 140 and 142 respectively and extend downwardly therefrom. The lower ends of levers 144, 146 and 148 are pivotally connected to the plungers of air cylinders 150, 152 and 154 which are mounted to rearward surface 22 of wall 20 as seen. Horizontally movable pistons 156, 158 and 160 are mounted in suitable supports on wall 20 and have their rearward ends in engagement with levers 144, 146 and 148 whereby selective retraction of the plungers of the cylinders 150, 152 and 154 causes pistons 156, 158 and 160 to be moved forwardly relative to wall 20.

Figure 3:
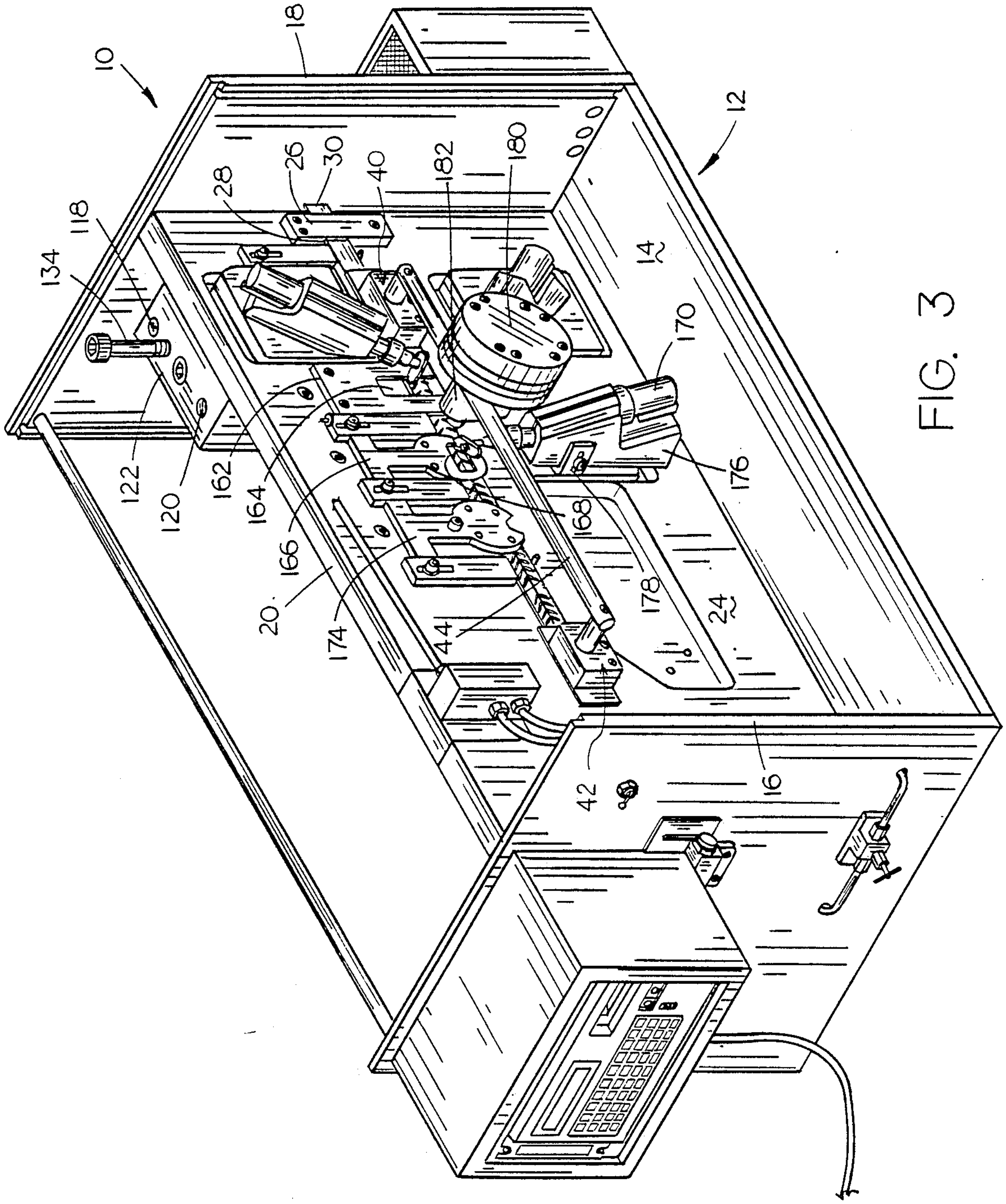
FIG. 3 is a view similar to FIG. 1 except that the cover of the apparatus has been removed.

Wall 20 is provided with suitable openings through which the forward ends of pistons 156, 158 and 160 movably extend. Mounted on forward surface 24 of wall 20 forwardly of piston 156 is a flat plate 162 having an opening 164 formed therein. As seen in FIG. 3, strip 30 passes behind the lower end of plate 162 and is partially exposed in the opening 164. Opening 164 of plate 162 is positioned forwardly of the piston 156 so that forward movement of the piston 156, relative to wall 20, will cause the strip 30 and the lower end of plate 162 to be moved forwardly with respect to wall 20 so that the strip 30 will move into engagement with either cutting tools 114 or 116.

Flat plate 166 is mounted on wall 20 laterally of plate 162 and has a horizontally disposed opening 168 formed in its lower end. As seen in FIG. 3, strip 30 passes behind the lower end of plate 166 and is partially exposed in the opening 168. Plate 166 is mounted in such a way so that the lower end thereof may be moved or deflected forwardly relative to the wall 20. Opening 168 of plate 166 is positioned forwardly of the piston 158 so that forward movement of the piston 168, relative to wall 20, will cause the strip 30 and the lower end of plate 166 to move forwardly so that the strip 30 will move into engagement with cutting tool 169 of air motor 170. Air motor 170 is selectively longitudinally mounted in mount 176 which is adjustably mounted in bracket 178 secured to wall 20.

Flat plate 174 is mounted on wall 20 laterally of plate 166 forwardly of piston 160. As seen in FIG. 3, strip 30 passes behind the plate 174 adjacent the lower end thereof. Forward movement of plunger 160 causes strip 30 to be moved forwardly into frictional or braking engagement with plate 174 as will be described hereinafter.

The numeral 180 refers to an air-operated punch secured to wall 20 by bracket 182. Punch 180 has a movable plunger 184 having a punch tip on the end thereof which is adapted to punch or notch the lower edge of the strip 30 in a predetermined spacing to facilitate individual leaves to be subsequently punched or stamped from the strip 30 corresponding to the vein cuts in the strip. The punch forms the notches 186 in the strip 130 to "index" the strip relative to the vein cuts. A conventional programmable controller or microprocessor MP is provided for controlling the operation of the various components of the apparatus.

In operation, the strip 30 is fed into the apparatus and the machine is actuated under the control of the microprocessor. At that time, cylinders 80 and 80' are actuated so that the plungers thereof are extended. Extension of the plungers of cylinders 80 and 80' results in the strip 30 being braked or gripped within the blocks 40 and 42. With the strip 30 being gripped by blocks 40 and 42, cylinder 84 is extended which causes the blocks 42 and 40 to be moved to the left as viewed from the front or to the right as viewed from the back of the apparatus. Blocks 40 and 42 are moved simultaneously through their interconnection with the bars 74 and 76. Extension of the plunger from cylinder 84 moves or advances the blocks 40 and 42 and the strip 30 since it is frictionally held by the blocks 40 and 42. Thus, extension of cylinder 86 causes the strip 30 to be advanced a predetermined increment.

Cylinders 80 and 80' are then retracted so that the grip on strip 30 is released. At that time, spring 78 returns blocks 40 and 42 to their original or starting position. Cylinder 36 is then extended so that the plunger 34 thereof is moved forwardly into engagement with the strip 30 so that the strip 30 is held in braking engagement with the block 26. At the same time, cylinder 154 is retracted so that piston 160 is moved forwardly which causes the strip 30 to be moved into braking or frictional engagement with the rearward side of plate 174. Thus, cylinders 36 and 154 cooperate to lock or hold the strip 30 in position. With the strip 30 held in position, cylinder 84 is retracted which permits the blocks 40 and 42 to return to their starting position by means of the spring 78.

Cylinder 128 is then extended to move the blocks 94 and 96 to their uppermost position with the uppermost position being limited by the stop 132 engaging the lower end of screw 134. Cylinder 150 is then retracted to cause piston 156 to be moved forwardly. Forward movement of piston 156 causes the strip 30 to be moved forwardly into engagement with the plate 162 so that the plate 162 is deflected forwardly. Forward deflection of the plate 162, and the strip 30, causes the strip 30 to be moved into engagement with the rotating cutting tool 116 thereby creating an angularly disposed vein cut at the lower end of the strip 30. When sufficient time has passed to enable the cutting tool 116 to engrave or cut the angular leaf vein, cylinder 150 is extended which causes the piston 156 to move rearwardly so that the strip 30 is moved out of engagement with the rotating cutting tool 116. At that time, cylinder 128 is retracted to lower blocks 94 and 96 to their lowermost position with the lowermost position being limited by the cap screw 136.

When the blocks 94 and 96 have been moved to their lowermost position as illustrated in FIG. 10, cylinder 150 is again retracted so that piston 156 moves forwardly to move the strip 30 into engagement with the rotating cutting tool 114 which creates an angularly disposed vein cut in the strip 30. When cutting tool 114 has created the vein cut, cylinder 150 is extended so that piston 156 moves rearwardly thereby permitting strip 30 to move rearwardly to move out of engagement with the rotating cutting tool 114.

After the cutting tools 114 and 116 have each created a single angularly disposed vein cut, the strip 30 is advanced a predetermined increment by the blocks 40 and 42. A second pair of angularly disposed vein cuts are then formed in the strip 30 by the cutting tools 114 and 116 and the sequence is repeated until the proper number of angularly disposed vein cuts have been formed. In the drawings, the strip is shown as having the vein cuts arranged in groups of four. When four angularly disposed vein cuts have been created in the upper and lower outer surfaces of the strip, the strip 30 is advanced a predetermined increment to begin the next sequence.

Figure 12:
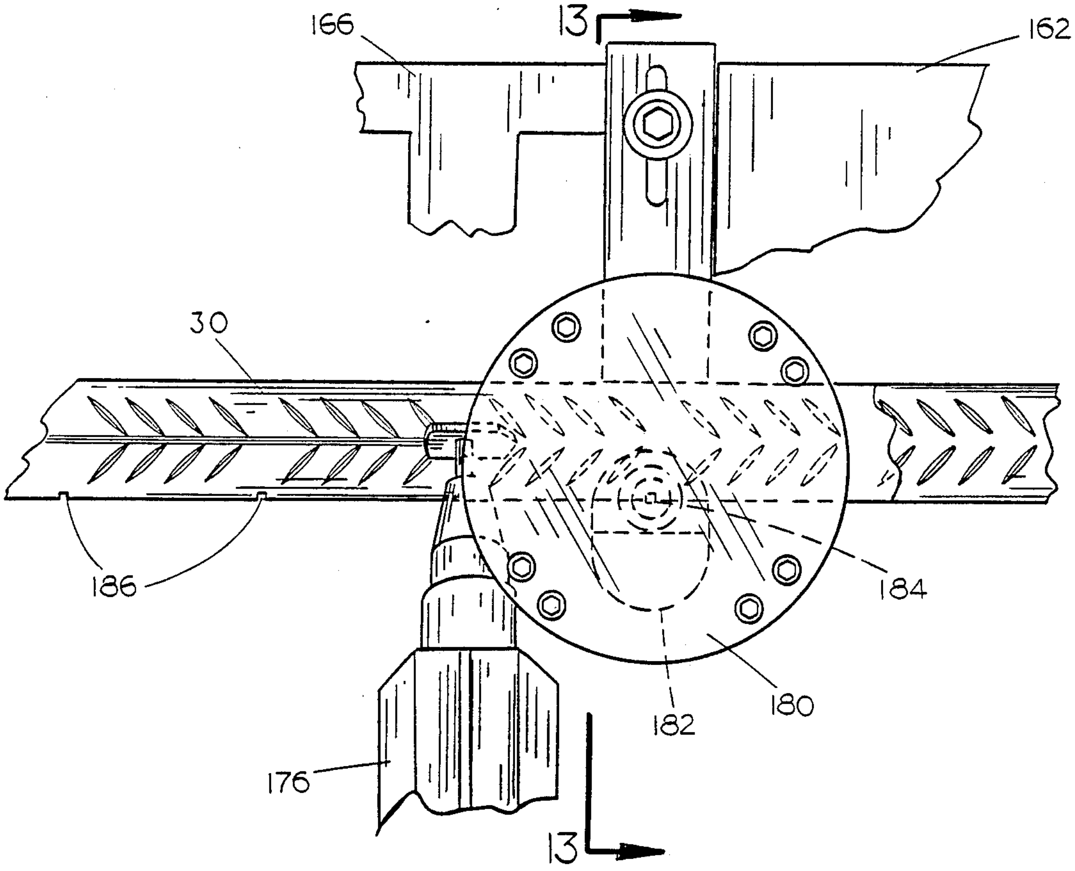
FIG. 12 is a partial front elevational view of the apparatus illustrating the manner in which the horizontal vein cut is created in the strip.
Figure 13:
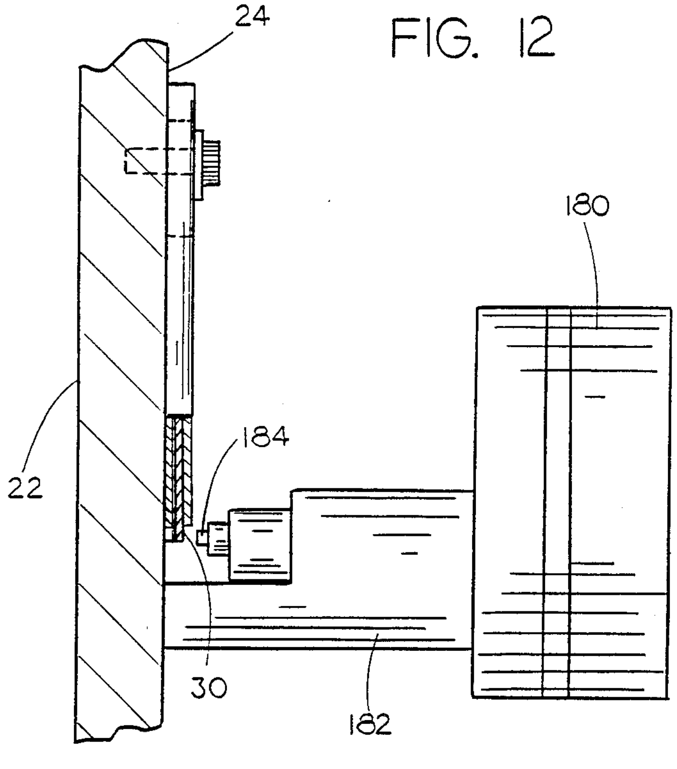
FIG. 13 is a sectional view as seen on lines 13—13 of FIG. 12.
Figure 14:
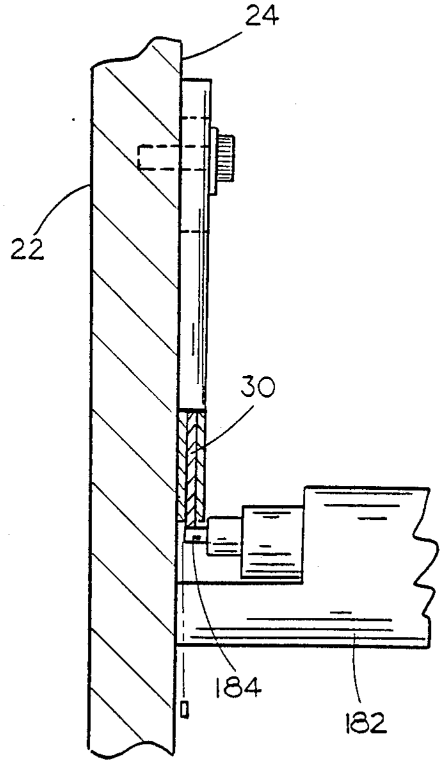
FIG. 14 is a view similar to FIG. 13 except that the indexing notcher has been moved inwardly to create a notch in the strip.
Figures 15, 16:
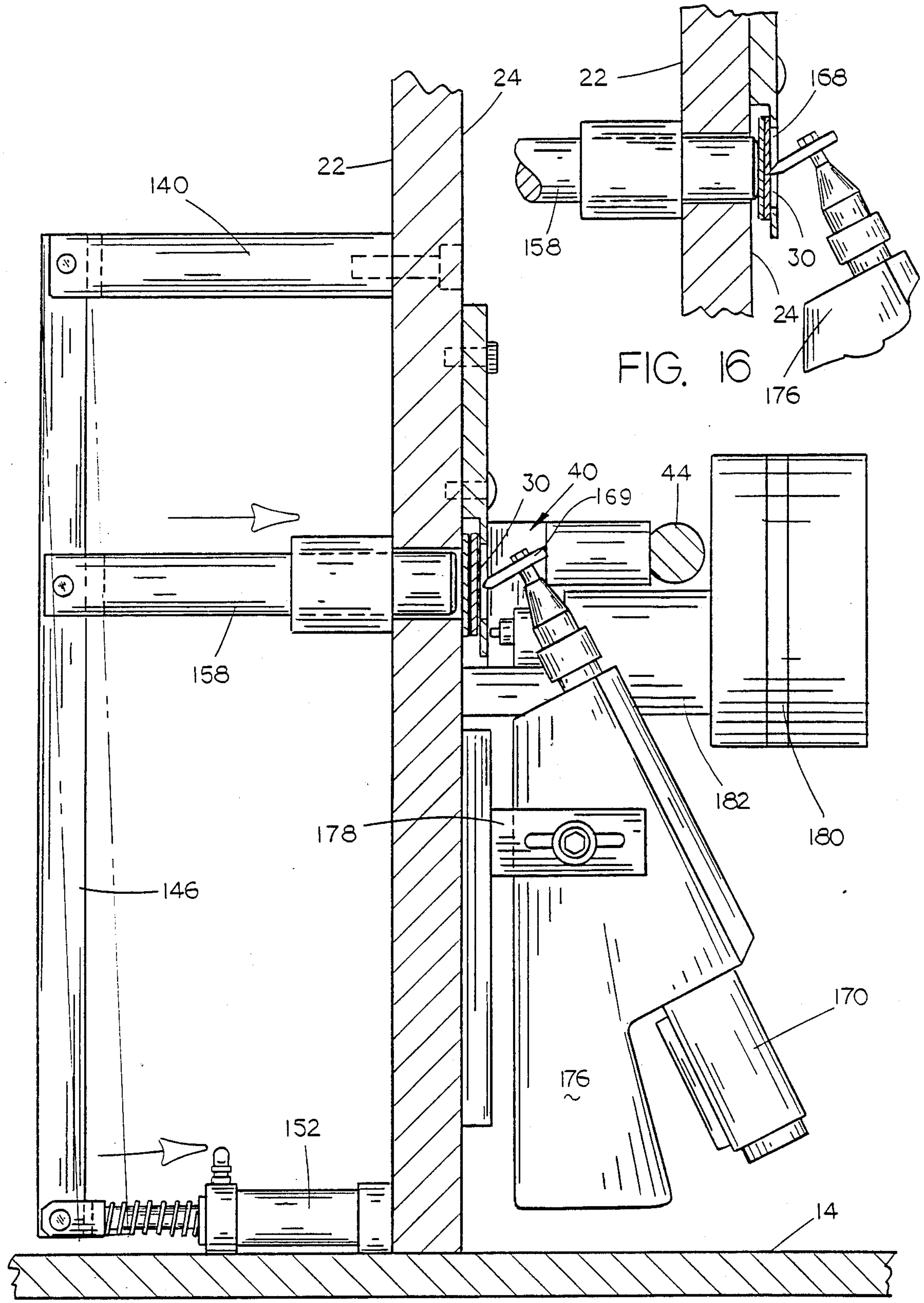
FIG. 15 is a sectional view as seen on lines 15—15 of FIG. 4.
FIG. 16 is a view similar to FIG. 15 except that the strip has been moved into engagement with the horizontal vein cutter.
Figure 17:
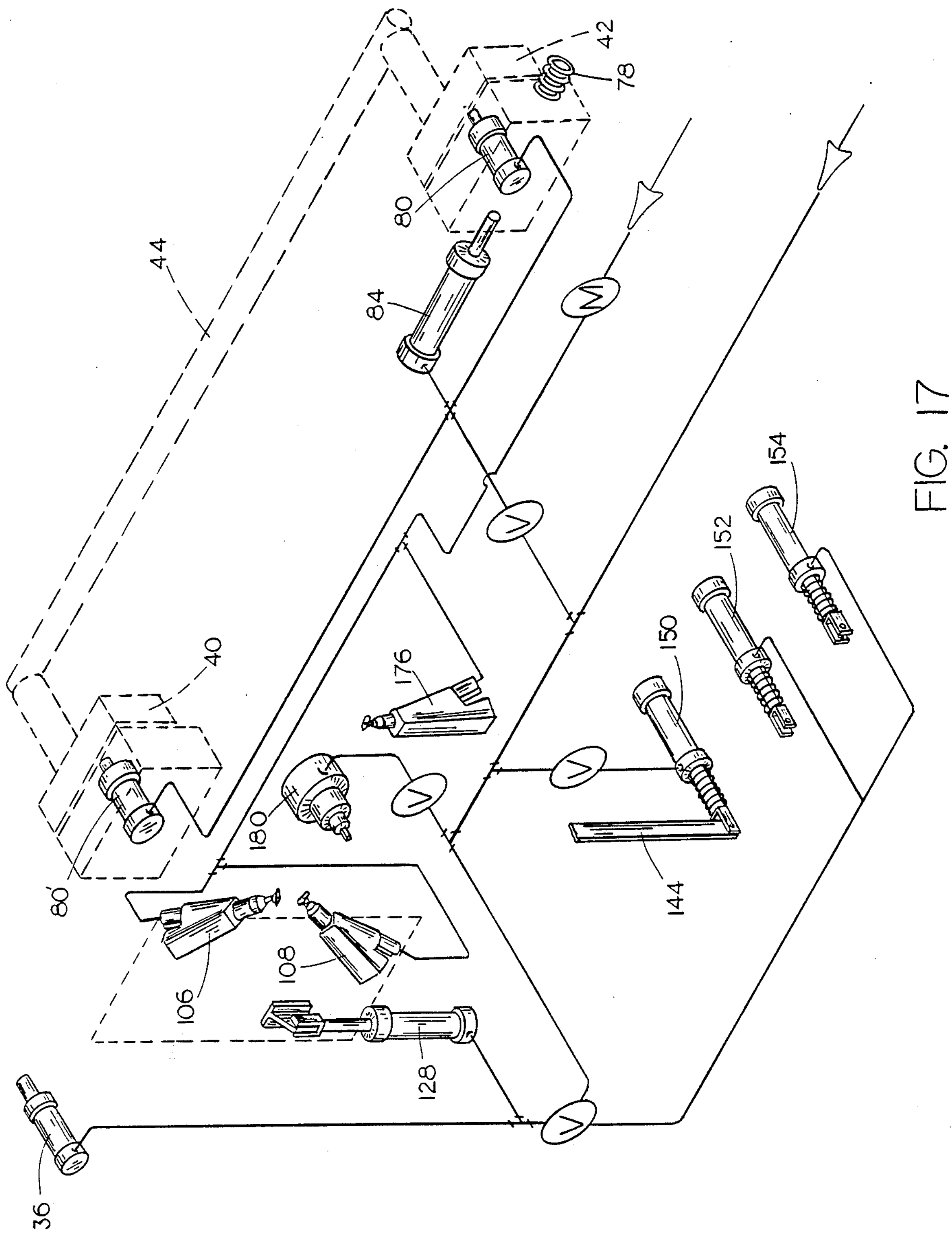
FIG. 17 is a partial schematic of the circuitry of the invention.

At the same time that the angularly disposed vein cuts are being formed in the strip 30, cylinder 152 is retracted to cause piston 158 to move forwardly thereby causing strip 30 to move forwardly into engagement with the rotating cutting tool 169 which creates a horizontally disposed vein cut in the strip as illustrated in FIG. 12.

At predetermined increments, punch 180 is also actuated so that the punch tip 184 punches notches 186 in the lower edge of the strip 30 as seen in FIG. 12. The notches 186 are important for positioning the strip during the subsequent leaf punching operation as described in the application filed simultaneously herewith entitled "Apparatus for Punching Leaves From a Gold Strip".

It can therefore be seen that a novel apparatus has been provided which permits a gold strip to be automatically engraved to create vein cuts therein thereby eliminating the time-consuming task of hand engraving. It can therefore be seen that the invention accomplishes at least all of its stated objectives.

We claim:

1. An apparatus for engraving vein cuts in an elongated, flat metal strip which will have leaves stamped therefrom for use in the manufacture of jewelry, comprising, a support means, means for movably supporting the metal strip on said support means, means for moving said strip relative to said support means, and powered engraving means mounted on said support means for cutting a continuous, longitudinally extending vein cut in one surface of said strip and for cutting a plurality of spaced-apart, angularly extending vein cuts in said one surface on opposite sides of said longitudinally extending vein cut.

2. The apparatus of claim 1 wherein control means is provided for coordinating the movement of said strip and said engraving means.

3. The apparatus of claim 1 wherein means is mounted on said support means for punching indexes notches on one edge of said strip at a predetermined spacing relative to the vein cuts.

4. An apparatus for engraving vein cuts in an elongated flat metal strip which will have leaves stamped therefrom for use in the manufacture of jewelry, comprising, an upstanding support means having first and second ends, means for supporting the strip in a horizontal position on said support means, strip advancer means on said support means for moving said strip relative to said support means, a first power engraving means mounted on said support means for engraving a continuous horizontal vein cut in one surface of the strip, a second power engraving means mounted on said support means for engraving a series of spaced-apart, angularly disposed vein cuts in said one surface on opposite sides of said horizontal vein cut, and control means for coordinating the operation of said strip advancer means and said power engraving means.

5. The apparatus of claim 4 wherein said second power engraving means comprises a pair of power engravers.

6. The apparatus of claim 4 wherein means is provided on said support means for indexing said strip relative to said vein cuts for facilitating the subsequent stamping of leaves from the strip.

7. The apparatus of claim 4 wherein said strip advancer means includes means which grips said strip and moves said strip horizontally relative to said support means.

8. The apparatus of claim 4 wherein said strip advancer means advances said strip in predetermined increments, and stops the advancing strip for a predetermined time after each increment.

9. The apparatus of claim 4 wherein means is mounted on said support means for moving said strip into engagement with said engraving means.

10. The apparatus of claim 4, wherein said second power engraving means includes selectively adjustable mounting means, such that the angle of the vein cuts engraved thereby is selectively adjustable.

11. The apparatus of claim 4, wherein said control means is adapted to engage and disengage said power engraving means at predetermined intervals, and adapted to activate said advancer means with respect to said predetermined intervals.

* * * * *